US010154576B2

(12) United States Patent
Takahashi et al.

(10) Patent No.: US 10,154,576 B2
(45) Date of Patent: *Dec. 11, 2018

(54) RADIATION IMAGE DETECTION APPARATUS INCLUDING PHOTOGRAPHIC MODE AND IRRADIATION DETECTION MODE, AND RADIATION IMAGE PHOTOGRAPHING SYSTEM INCLUDING THE SAME

(71) Applicant: FUJIFILM Corporation, Tokyo (JP)

(72) Inventors: Yasufumi Takahashi, Kanagawa (JP); Naoto Iwakiri, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/840,684

(22) Filed: Dec. 13, 2017

(65) Prior Publication Data

US 2018/0103533 A1 Apr. 12, 2018

Related U.S. Application Data

(63) Continuation of application No. 15/071,416, filed on Mar. 16, 2016, now Pat. No. 9,867,266, and a (Continued)

(30) Foreign Application Priority Data

Nov. 22, 2011 (JP) .................. 2011-255308

(51) Int. Cl.
*H05G 1/64* (2006.01)
*H04N 5/32* (2006.01)

(52) U.S. Cl.
CPC ................ *H05G 1/64* (2013.01); *H04N 5/32* (2013.01)

(58) Field of Classification Search
CPC .................................. H04N 5/32; H05G 1/64
See application file for complete search history.

(56) References Cited

U.S. PATENT DOCUMENTS

| 5,894,129 A | 4/1999 | Pool |
| 6,404,854 B1 | 6/2002 | Carroll et al. |

(Continued)

FOREIGN PATENT DOCUMENTS

| JP | S 61-278776 A | 12/1986 |
| JP | H 09-107503 A | 4/1997 |

(Continued)

OTHER PUBLICATIONS

United States Notice of Allowance dated Sep. 6, 2017 in co-pending U.S. Appl. No. 15/071,416.

(Continued)

*Primary Examiner* — Jason McCormack
*Assistant Examiner* — Sean Luck
(74) *Attorney, Agent, or Firm* — McGinn I.P Law Group, PLLC

(57) ABSTRACT

A radiation image detection apparatus, including an image receiving unit having a two-dimensional array of a plurality of pixels that generate electrical charges when being subjected to irradiation of radiation, the plurality of pixels including a plurality of pixels for detecting an image and one or more pixels for detecting irradiation; an image data generation unit configured to generate image data based on an electrical signal output from the respective pixels for detecting the image, an irradiation detection unit configured to detect the irradiation of radiation based on the electrical signal output from the respective pixels for detecting irradiation, a communication unit that transmits the image data generated in the image data generation unit, and a control unit configured to include a plurality of control modes including a photographing mode generating the image data, (Continued)

an irradiation detection mode detecting the irradiation of radiation and a standby mode.

6 Claims, 11 Drawing Sheets

Related U.S. Application Data continuation of application No. 13/681,998, filed on Nov. 20, 2012, now Pat. No. 9,313,869.

(56) References Cited

U.S. PATENT DOCUMENTS

| | | |
|---|---|---|
| 2003/0086523 A1 | 5/2003 | Tashiro et al. |
| 2003/0213914 A1 | 11/2003 | Kobayashi et al. |
| 2004/0179649 A1 | 9/2004 | Yagi |
| 2006/0169907 A1 | 8/2006 | Shinden |
| 2009/0021607 A1 | 1/2009 | Takenaka et al. |
| 2009/0022276 A1 | 1/2009 | Ohara |
| 2009/0109313 A1 | 4/2009 | Liu et al. |
| 2009/0208191 A1 | 8/2009 | Imai et al. |
| 2009/0294679 A1 | 12/2009 | Yagi et al. |
| 2010/0207032 A1 | 8/2010 | Tsubota et al. |
| 2011/0013746 A1 | 1/2011 | Zeller et al. |
| 2011/0180717 A1 | 7/2011 | Okada |
| 2011/0317809 A1 | 12/2011 | Eguchi |
| 2014/0183373 A1 | 7/2014 | Eguchi |

FOREIGN PATENT DOCUMENTS

| | | |
|---|---|---|
| JP | 2003-126072 A | 5/2003 |
| JP | 2007-181183 A | 7/2007 |
| JP | 2008-132216 A | 6/2008 |
| JP | 2008-142093 A | 6/2008 |
| JP | 2010-214095 A | 9/2010 |
| JP | 2011-174908 A | 9/2011 |
| WO | WO 2006/095538 A1 | 9/2006 |
| WO | WO 2010/073894 A1 | 7/2010 |

OTHER PUBLICATIONS

United States Office Action dated May 5, 2017 in co-pending U.S. Appl. No. 15/071,416.
United States Office Action dated Nov. 21, 2016 in co-pending U.S. Appl. No. 15/071,416.
Japanese Office Action dated May 7, 2015, with an English translation.
Japanese Office Action dated Dec. 3, 2013, with an English translation.
Notice of Allowance dated Dec. 18, 2015 in U.S. Appl. No. 13/681,998.
U.S. Office Action dated Jun. 3, 2015 in U.S. Appl. No. 13/681,998.
U.S. Office Action dated Feb. 3, 2015 in U.S. Appl. No. 13/681,998.
Japanese Office Action issued in Application No. 2015-196074 dated Oct. 11, 2016 with an English translation thereof.

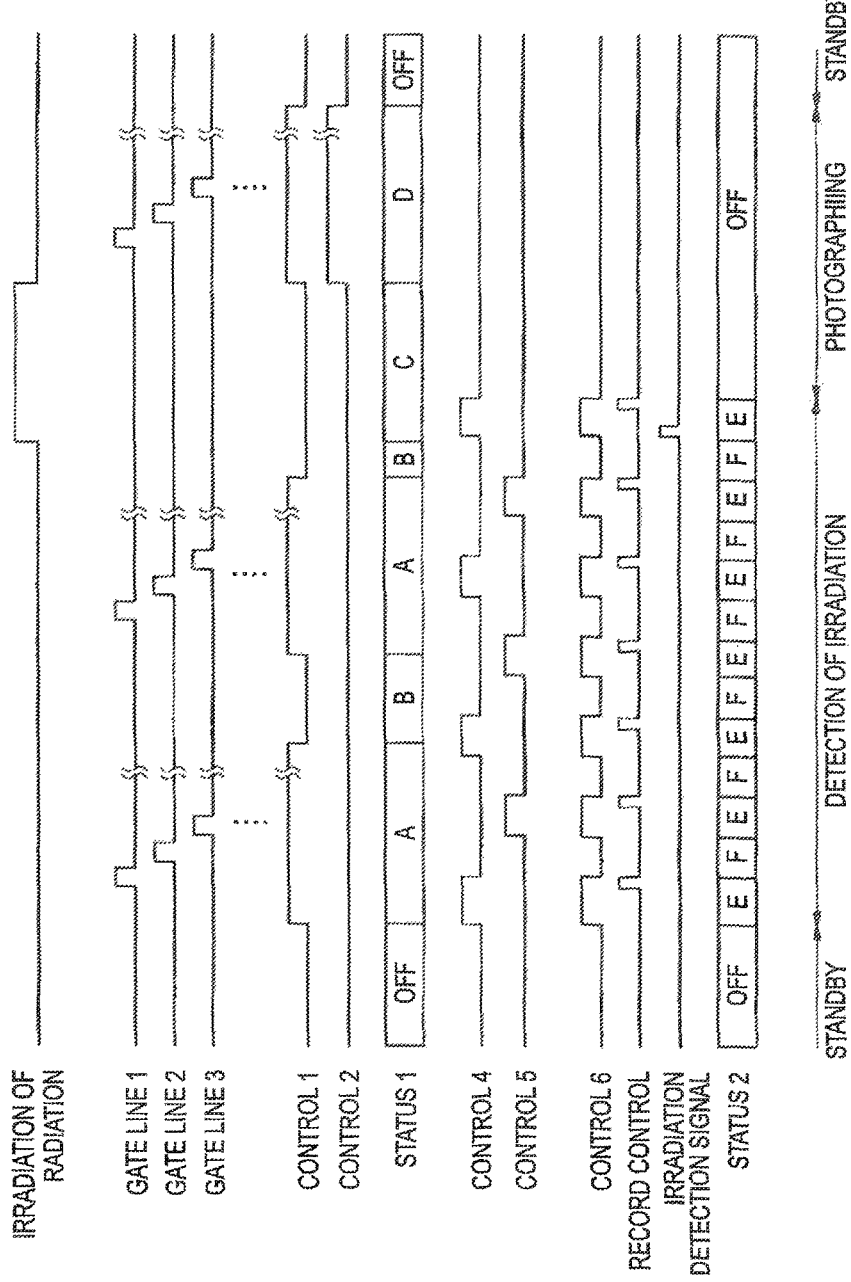

RADIATION IMAGE DETECTION APPARATUS INCLUDING PHOTOGRAPHIC MODE AND IRRADIATION DETECTION MODE, AND RADIATION IMAGE PHOTOGRAPHING SYSTEM INCLUDING THE SAME

CROSS-REFERENCE TO RELATED APPLICATIONS

The present application is a Continuation Application of U.S. patent application Ser. No. 15/071,416, filed on Mar. 16, 2016, which is a Continuation Application of U.S. patent application Ser. No. 13/581,998, filed on Nov. 20, 2012, now U.S. Pat. No. 9,313,869 issued on Apr. 12, 2016, which is based on Japanese Patent Application No. 2011-255308 filed on Nov. 22, 2011, the entire contents of which are hereby incorporated by reference.

BACKGROUND OF THE INVENTION

1. Technical Field

The present invention relates to a radiation image detection apparatus and a radiation image photographing system.

2. Related Art

An X-ray image photographing has been widely distributed in areas such as, for example, medical diagnoses and a non-destructive inspection. In a general X-ray image photographing, an X-ray is irradiated to a subject and attenuated while being transmitted through each part of the subject. The transmitted X-ray is then detected and an X-ray image of the subject is acquired based on the intensity distribution of the transmitted X-ray.

Recently, as for a medium for detecting an X-ray, a flat panel detector (FPD) having a two-dimensional array of pixels that generates an electrical charge when subjected to X-ray irradiation and generating an image data based on an electrical signal output from each pixel of the pixel array has been used. In the X-ray image photographing, a so-called an electronic cassette which is configured to accommodate the FPD in a portable case has been widely used.

Further, there is a known FPD configured to detect X-ray irradiation based on electrical signal output from the pixel (for example, Patent Document 1 (JP-A-2003-126072)). In the FPD disclosed in Patent Document 1, all the pixels are installed to be utilized in both image acquisition and irradiation detection, while in a FPD disclosed in Patent Document 2 (JP-A-2011-174908), a pixel for detecting irradiation is installed separately from a pixel for detecting image.

The FPD configured to detect X-ray irradiation based on electrical signal output from the pixel does not need to be synchronized with an X-ray irradiation apparatus or a console controlling the operation of the X-ray irradiation apparatus and an operability is improved.

SUMMARY OF THE INVENTION

The electronic cassette is mounted with a battery and the operating power for the respective components of the FPD is supplied by the battery. Therefore, it is required to reduce power consumption.

The output signal of the respective pixels is amplified by an amplifier and the amplifier for amplifying the output signal of the pixel for detecting image is typically installed for each pixel column in a two-dimensional array of pixels. Accordingly, a signal processing circuit generating an image data based On the output signal of the pixel for detecting image is installed with multiple amplifiers or analog devices such as an A/D converter converting signals output from the amplifiers into digital data, and the operating power of the signal processing circuit is relatively high.

In a case where all the pixels are utilized in both image acquisition and irradiation detection as in a FPD described in Patent Document 1, since an operating power needs to be continuously supplied to a signal processing circuit for generating an image data until X-ray is irradiated, there is a concern that a battery consumption may be increased.

Meanwhile, as in a FPD described in Patent Document 2, in a case where a signal processing circuit for detecting X-ray irradiation based on an output signal of the pixel for detecting irradiation and the pixel for detecting image is separately installed, very few pixels are enough for detecting irradiation as compared to the number of the pixels fir detecting image and also very few amplifiers may be installed for amplifying the output signals of the pixel for detecting irradiation. Therefore, an operating power of a signal processing circuit for detecting X-ray irradiation is lower than that of a signal processing circuit for generating image data. Accordingly, although an operating power has been continuously supplied to the signal processing circuit for detecting X-ray irradiation until X-ray is irradiated, power consumption can be reduced.

However, when a standby period becomes a relatively long time, an electrical charge is accumulated in the pixels due to, for example, the dark current, so that the signal processing circuit needs to be driven for generating image data periodically in order to reset the pixel for detecting image. In this case, regarding the supplying of the operating power to the signal processing circuit for generating image data, there was a room for improvement in reducing power consumption.

An illustrative aspect of the invention is to reduce power consumption of a radiation image detection apparatus detecting a radiation irradiation based on an electrical signal output from the pixel.

According to an aspect of the invention, a radiation image detection apparatus, includes: an image receiving unit having a two-dimensional array of a plurality of pixels for detecting image and one or more pixels for detecting irradiation that generate electrical charges when being subjected to irradiation of radiation: an image data generation unit configured to generate an image data based on an electrical signal output from the respective pixels for detecting image; an irradiation detection unit configured to detect an irradiation of radiation based on the electrical signal output from the respective pixels for detecting irradiation; and a control unit configured to include a plurality of control modes including a photographing mode generating an image data and an irradiation detection mode detecting an irradiation of radiation, in which the image data generation unit includes a first amplifying unit amplifying the electrical signal output from the respective pixels for detecting image and a data processing unit converting the electrical signal amplified by the first amplifying unit into the image data, and is configured to separately supply operating power to each of the first amplifying unit and the data processing unit, and the control unit, during the irradiation detection mode, stops supplying of an operating power to the data processing unit until the irradiation of radiation is detected by the irradiation detection unit, and when the irradiation of radiation is detected by the irradiation detection unit, the control unit proceeds to the photographing mode and begins supplying the operating power to the data processing unit.

With the configuration discussed above, it is possible to reduce power consumption of a radiation image detection apparatus detecting a radiation irradiation based on an electrical signal output from pixels.

BRIEF DESCRIPTION OF THE DRAWINGS

FIG. 11 is a timing chart illustrating the operation timings of the respective components of a radiation image detecting apparatus illustrated in FIG. 10.

DETAILED DESCRIPTION OF EMBODIMENTS OF THE INVENTION

Figure 1:
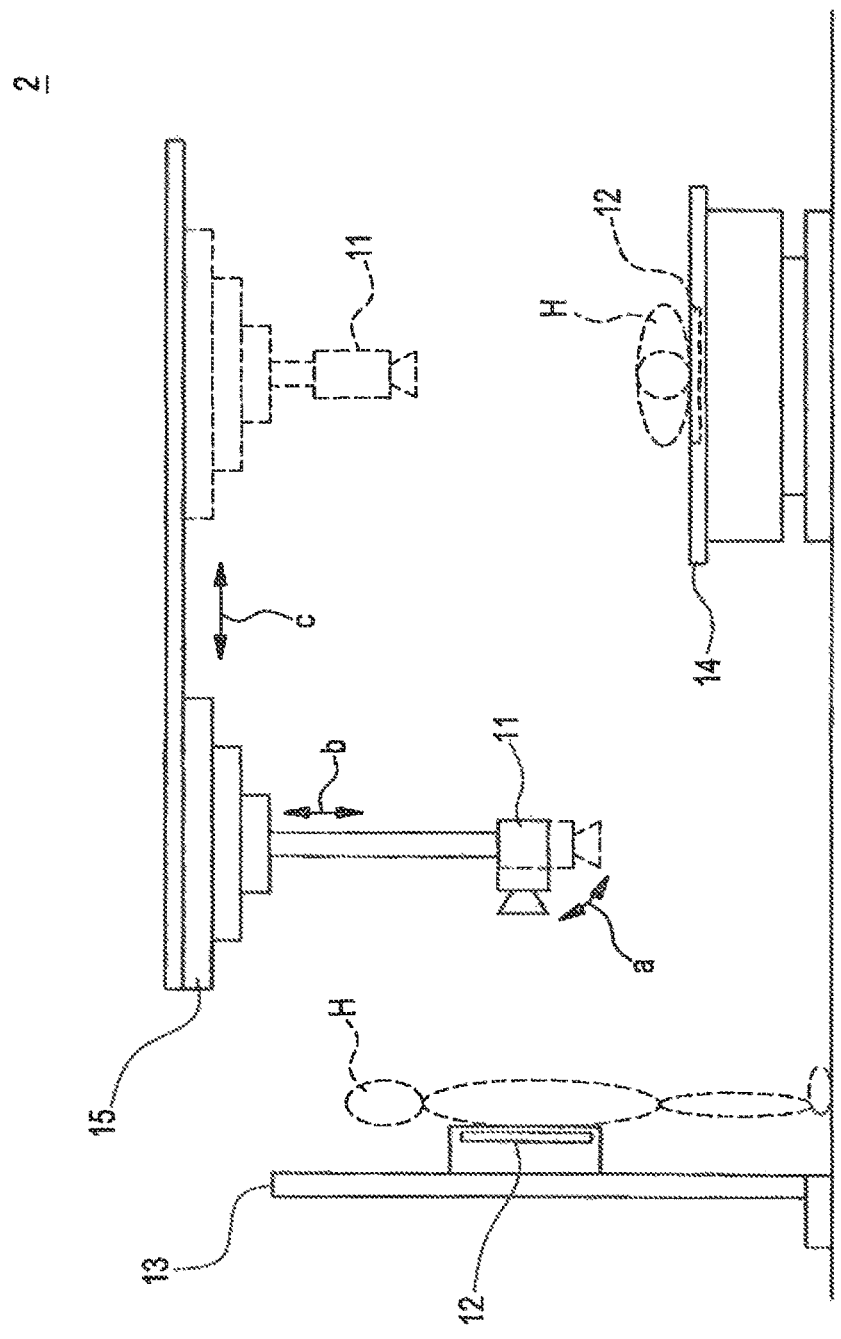
FIG. 1 is a view diagrammatically illustrating a configuration of an example of a radiation image photographing system in accordance with a first exemplary embodiment of the present invention.
Figure 2:
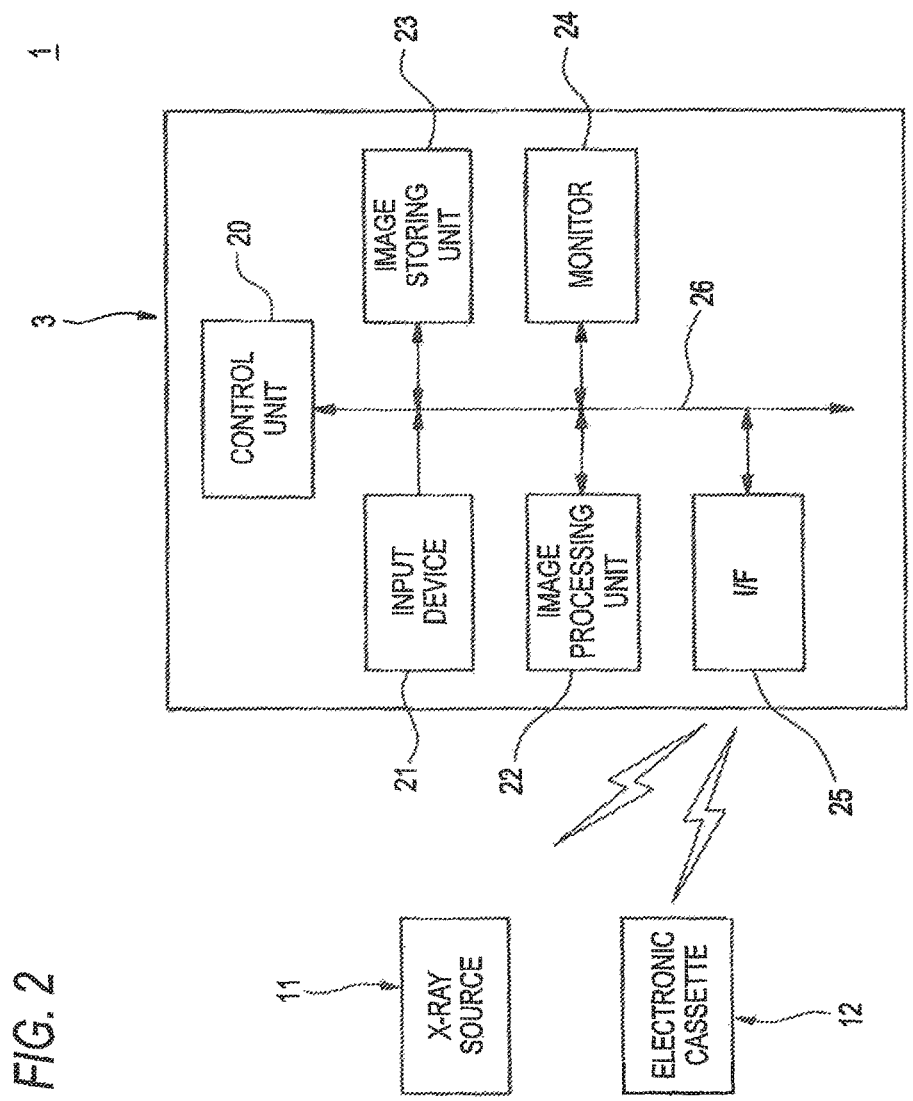
FIG. 2 is a view illustrating a control block of the radiation image photographing system illustrated in FIG. 1.

An X-ray image photographing system 1 is largely divided into an X-ray image photographing apparatus 2 and a console 3. The X-ray image photographing apparatus 2 includes an X-ray source 11 irradiating X-ray on a subject H and an electronic cassette 12 (X-ray image detecting apparatus) that detects X-ray emitted from the X-ray source 11 and having transmitted the subject H and generates an image data. The console 3 controls operations of the respective components of the X-ray image photographing apparatus 2 such as the X-ray source 11 or the electronic cassette 12 based on operation of an operator.

A vertical stand 13 used in performing an X-ray image photographing in standing position and a horizontal stand 14 used in performing an X-ray image photographing in supine position are installed in the X-ray radiography room provided with the X-ray image photographing apparatus 2. The electronic cassette 12 is maintained in the vertical stand 13 when performing the X-ray image photographing in standing position and maintained in the horizontal stand 14 when performing the X-ray image photographing in supine position.

Further, the X-ray radiography room is provided with a support movement mechanism 15 that supports a single X-ray source 11 to be rotatable about a horizontal shaft (direction depicted in an arrow a shown in FIG. 1), to be movable in vertical direction (direction depicted in an arrow b shown in FIG. 1) and to be further movable in horizontal direction (direction depicted in an arrow c shown in FIG. 1), such that the X-ray image photographing in standing position as well as supine position can be performed with the single X-ray source 11. Although not illustrated, the support movement mechanism 15 includes a driving source rotating the X-ray source 11 about a horizontal shaft and a driving source moving the X-ray source 11 in a vertical direction and a driving source moving the X-ray source 11 in a horizontal direction. The driving sources are controlled by the console 3 based on settings manipulated by an operator in the console 3.

The console 3 is configured as a server computer and includes a control device 20 constituted with CPU, ROM and RAM and the like, an input device 21 through which an operator inputting a photographing information or issuing an exposure instruction, an image processing unit 22 performing appropriate image processing on an X-ray image data obtained by the electronic cassette 12, an image storing unit 23 storing the X-ray image data having been subjected to the image processing, and a monitor 24 displaying the photographing information input in the input device 21 or the X-ray image data generated in the image processing unit 22, and an interface (I/F) 25 connected with the respective components of the X-ray image photographing system 1, and these components described above are connected with each other through a bus 26.

The interface 25, through wired or wireless communication, transmits and receives various information such as an exposure condition, which will be described below, to and from the X-ray source 11, and transmits and receives various information such as image data to and from the electronic cassette 12.

Figure 3:
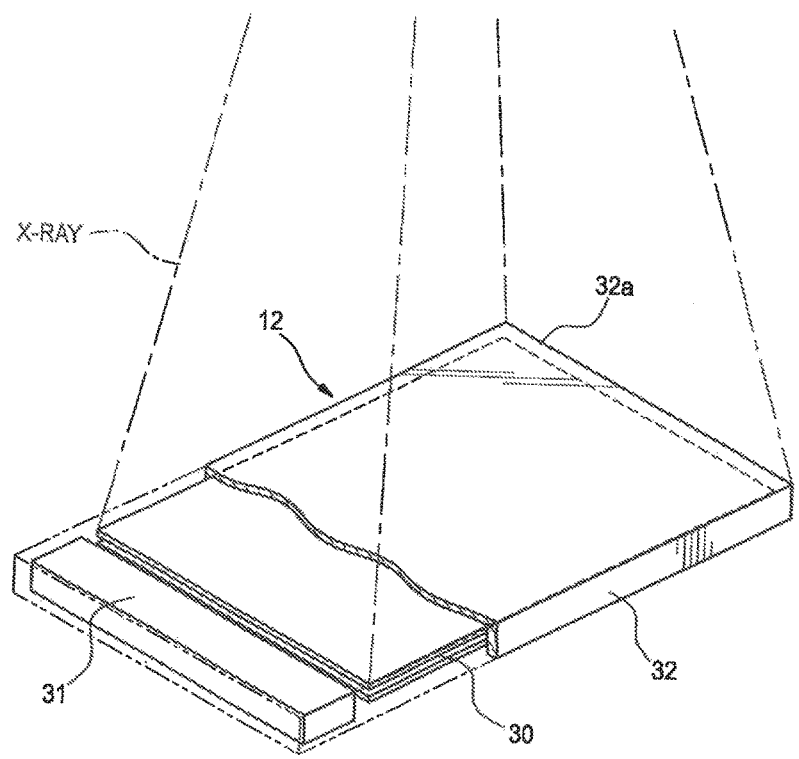
FIG. 3 is a view illustrating a configuration of a radiation image detecting apparatus in the radiation image photographing system illustrated in FIG. 1.

FIG. 3 illustrates a configuration of the electronic cassette 12.

The electronic cassette 12 includes a FPD 30, a battery 31 supplying operating power to the respective components of the FPD 30 and a housing 32 accommodating the FPD 30 and the battery 31. The X-rays having transmitted a subject transmit a ceiling plate part 32a of the housing 32 and incident on an image receiving unit of the FPD 30 accommodated in the housing 32.

The housing 10 is formed of a material having an excellent X-ray transmissivity, and is made of such as, for example, carbon fiber, aluminum, magnesium or bio-nanofiber (cellulose microfibril), or composite materials, in consideration of a strength-to-weight ratio. A material including, for example, a reinforced fiber resin is utilized as the composite material and the reinforced fiber resin contains such as, for example, carbon or cellulose. Specifically, composite materials such as a carbon fiber reinforced plastics (CFRP), a foam sandwiched by the CFRPs and a foam of which surface is coated with the CFRP are utilized.

Figure 4:
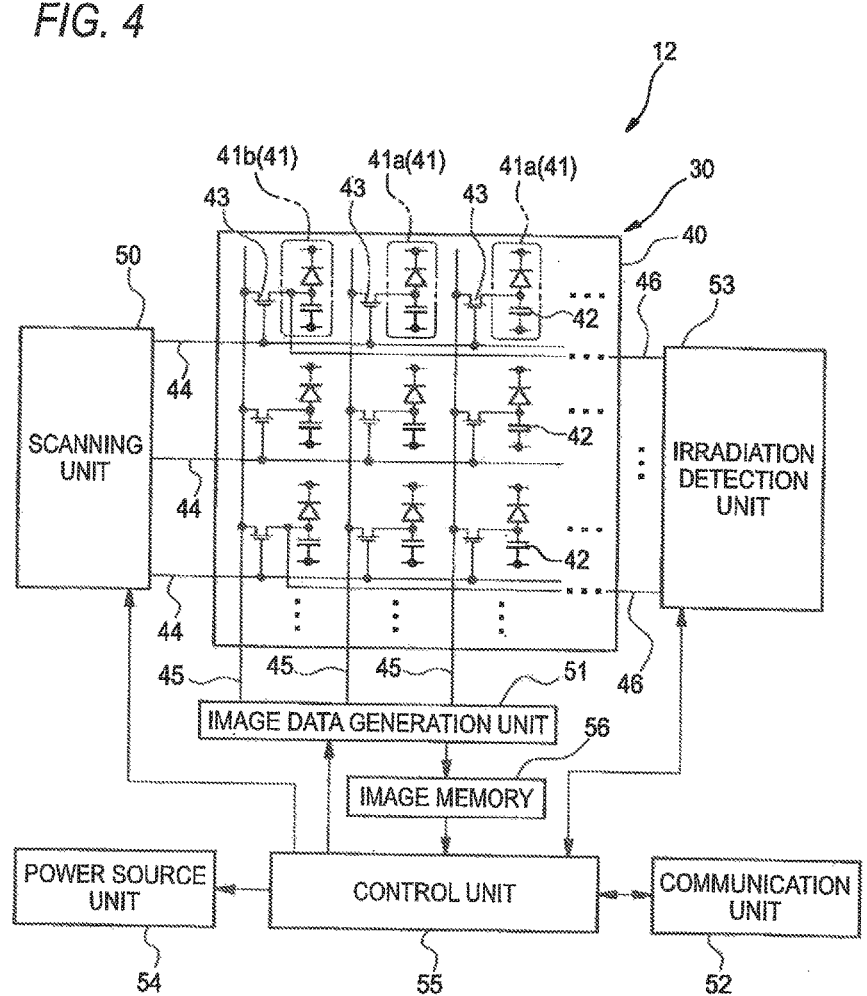
FIG. 4 is a view illustrating a configuration of a radiation image detector in the radiation image detecting apparatus illustrated in FIG. 3.

FIG. 4 illustrates a configuration of the FPD 30.

The FPD 30 includes an image receiving unit 40 formed by two-dimensionally arranging a plurality of pixels 41 receiving X-ray to generate electrical charges on an active matrix thin film transistor (TFT) array substrate.

The pixel 40 may be configured as a direct conversion type X-ray detecting device which directly converts the X-rays into the electrical charges at a conversion layer (not illustrated) made of, for example, amorphous selenium, and accumulates the converted electrical charges in a capacitor 42 connected to an electrode of a lower portion of the conversion layer. In addition, the pixel 41 may be configured as an indirect conversion type X-ray detecting device which converts X-rays into visible rays first using a scintillator (not illustrated) made of, for example, gadolinium oxide ($Gd_2O_3$), sulfated gadolinium ($Gd_2O_2S$) or cesium iodide (CsI), and then converts the converted visible rays into the electrical charges using a photodiode to accumulate the converted electrical charges.

Among the pixel group, one or more pixels 41 are utilized to detect the X-ray irradiation and the remaining pixels 41 are utilized to detect the X-ray image. In the following, a pixel 41 for detecting the X-ray image is referred to as an image detecting pixel 41a and a pixel 41 for detecting X-ray irradiation is referred to as an irradiation detecting pixel 41b.

One or more irradiation detecting pixels 41b may be installed in the two-dimensional array of pixels, but a distributed installation of a plurality of the irradiation detecting pixels 41b is preferable. For example, even when material having a relatively high X-ray absorption capability such as bones is disposed above some of the irradiation detecting pixels 41b, sufficient charges are generated according to an X-ray irradiation in the irradiation detecting pixels 41b where the high X-ray absorbing material is not overlapped, and the X-ray irradiation can be surely detected based on the electrical charges generated in the irradiation detecting pixels 41b.

The TFT array substrate is installed with the TFT switching devices 43 corresponding to the respective pixels 41, and a gate line 44 and a data line 45 are installed at each row and each column of the two-dimensional array of pixels, respectively. Each gate electrode of each TFT switching device 43 is connected to the gate line 44, each source electrode thereof is connected to a capacitor 42 of the pixel 41 corresponding thereto, and each drain electrode is connected to the data line 45.

The TFT array substrate is installed with a signal line 46 connected between the capacitor 42 of the pixel for detecting irradiation 41b and the TFT switching device 43. In the illustrated example, one pixel for detecting irradiation 41b is installed in each of the plurality rows, the signal line 46 is installed for each row in which the pixel for detecting irradiation 41b is installed, and one pixel for detecting irradiation 41b is connected to each signal line 46. A plurality of the irradiation detecting pixels 41b may be connected to each signal line 46.

The FPD 30 includes a scanning unit 50 that controls a timing at which electrical charges accumulated on the respective image detecting pixels 41a are read-out, an image data generation unit 51 that generates an image data based on the electrical charges read-out from the respective image detecting pixels 41a, a communication unit 52 that transmits the image data generated in the image data generation unit 51 to the console 3, an irradiation detection unit 53 that detect the X-ray irradiation based on the charges read-out from the respective pixel for detecting irradiation 41b, and a battery 31, and is provided with a power source unit 54 supplying operating power for the respective components of the FPD 30, and a control unit 55 that controls supplying of the operating power to the respective components of the FPD 30 from the power source unit 54 and operation of the respective components of the FPD 30.

Each gate line 44 is connected to the scanning unit 50 and each data line 45 is connected to the image data generation unit 51. The scanning unit 50 supplies a driving pulse to the TFT switching device 43 through the gate line 44 and turns ON the TFT switching device 43. The electrical charges accumulated on the pixel for detecting image 41a to which the TFT switching device 43 having been turned ON is connected is read-out as the TFT switching device 43 is turned ON, and is transmitted through the data line 45 as electrical signal and input to the image data generation unit 51.

Meantime, each signal line 46 is connected to the irradiation detection unit 53. The charge accumulated on the respective irradiation detecting pixels 41b is transmitted through the signal line 46 as an electrical signal and input to the irradiation detection unit 53, irrespective of ON/OFF of the TFT switching device 43 corresponding to 41b.

Figure 5:
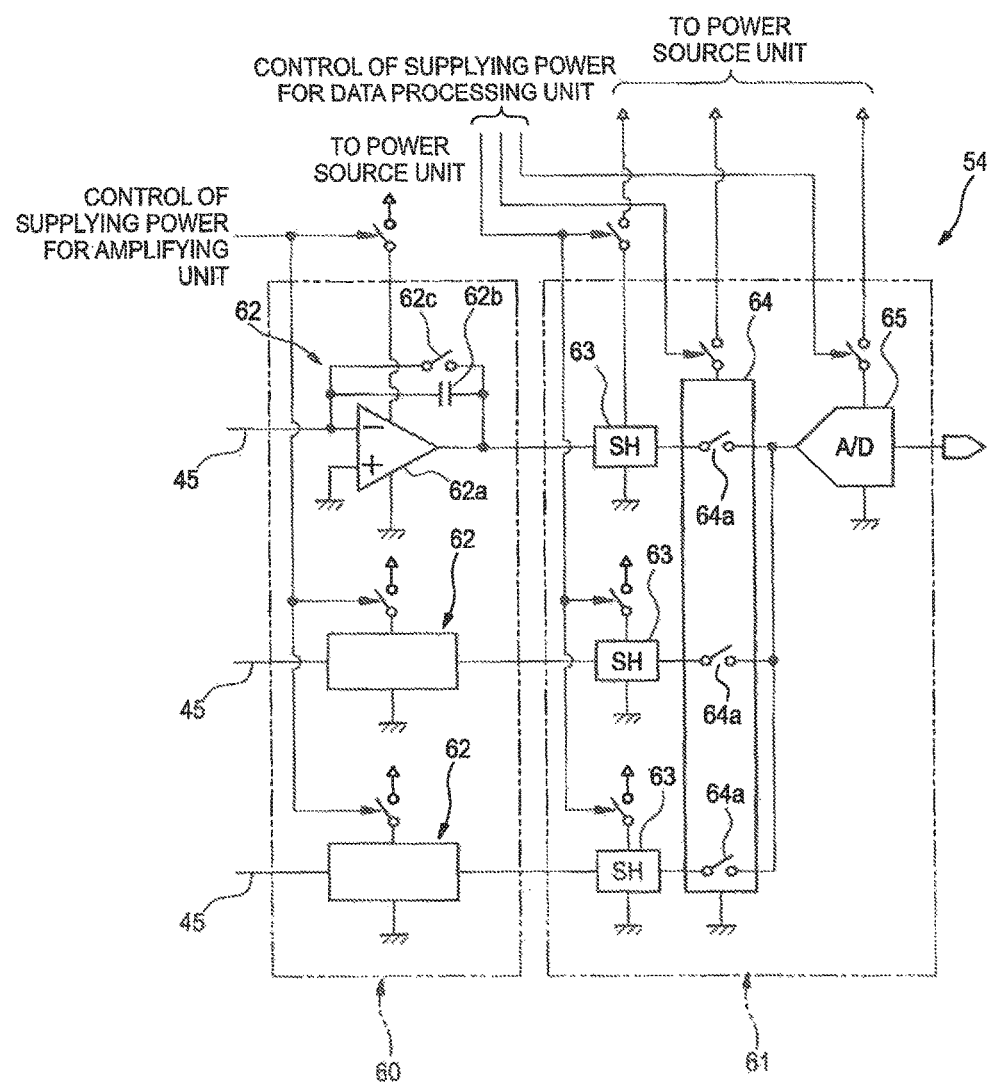
FIG. 5 is a view illustrating a circuit configuration of an image data generation unit of the radiation image detector illustrated in FIG. 4.

FIG. 5 illustrates a circuit configuration of the image data generation unit 51.

The image data generation unit 51 includes an amplifying unit 60 that amplifies electrical signal output from the respective image detecting pixels 41a, and a data processing unit 61 that converts the electrical signal amplified by the amplifying unit 60 into an image data.

The amplifying unit 60 includes a plurality of variable gain pre-amplifiers (charge amplifiers) 62 installed to be corresponded to each of the plurality of data lines 45, and each of the variable gain pre-amplifier 62 is configured to include an operation amplifier 62a of which positive input side is connected to ground, a condenser 62b connected in parallel between negative input side of the operation amplifier 62a and output side thereof, and a reset switch 62c, and the data line 45 is connected to the negative input side of the operation amplifier 62a. The switching ON/OFF of the reset switch 62c is controlled by the control unit 55.

The data processing unit 61 includes a plurality of sample and hold circuits 63 installed to be corresponded to the respective variable gain pre-amplifier 62, a multiplexer 64 and an analog/digital (A/D) converter 65. The multiplexer 64 is configured to include switches 64a for sequentially selecting inputs from the plurality of sample and hold circuits 63. The sample timing of the sample and hold circuit 63 and the input selection by the switches 64a of the multiplexer 64 is controlled by the control unit 55.

The electronic cassette 12 is configured to make it possible to separately supply operating power to the amplifying unit 60 and the data processing unit 61, and the supplying of the operating power to the amplifying unit 60 and the data processing unit 61 is controlled by the control unit 55.

When an X-ray image is detected, the driving pulse is supplied to the TFT switching device 43 through the gate line 44 from the scanning unit 50, and the TFT switching device 43 is turned ON in a unit of row. Electrical charges are read-out from the pixel for detecting image 41a to which the respective TFT switching devices 43 having been turned ON of the image detecting pixels 41a having accumulated electrical charges on the capacitor 42 by being subjected to an X-ray irradiation, and the charge read-out is transmitted through the data line 45 connected to the TFT switching device 43 as an electrical signal and input to corresponding variable gain pre-amplifier 62.

Electrical signal input to the variable gain pre-amplifier 62 is amplified with a predetermined amplification factor in the variable gain pre-amplifier 62.

The respective sample and hold circuit 63 are driven for a predetermined time, and a signal level of the electrical signal (voltage signal) amplified by the corresponding variable gain pre-amplifier 62 is maintained at the sample and hold circuit 63. The signal level maintained at the respective sample and hold circuits 63 are sequentially selected and input to the A/D convert 65 to be converted from analog to digital.

The image data generation unit 51 is connected with an image memory 56, and the image data is sequentially stored in the image memory 56.

The reset switch 62c of the respective variable gain pre-amplifiers 62 is turned ON for a predetermined time. By doing this, the charges read-out from the pixel for detecting image 41a and accumulated on the condenser 62b is discharged. The respective image detecting pixels 41a are reset after the charges are read-out from the capacitor 42 thereof and discharged from the condenser 62b having accumulated the read-out charges.

As described above, a reading-out of electrical charges from the image detecting pixels 41a is performed one row by one row to generate the X-ray image data.

A pixel data of the X-ray image data located at positions of the respective irradiation detecting pixels 41b is generated by being interpolated using the pixel data obtained by the image detecting pixels 41a located around the irradiation pixel for detecting image 41. The correction processing for the defect image may be performed, for example, in the image processing unit 22 of the console 3.

Figure 6:
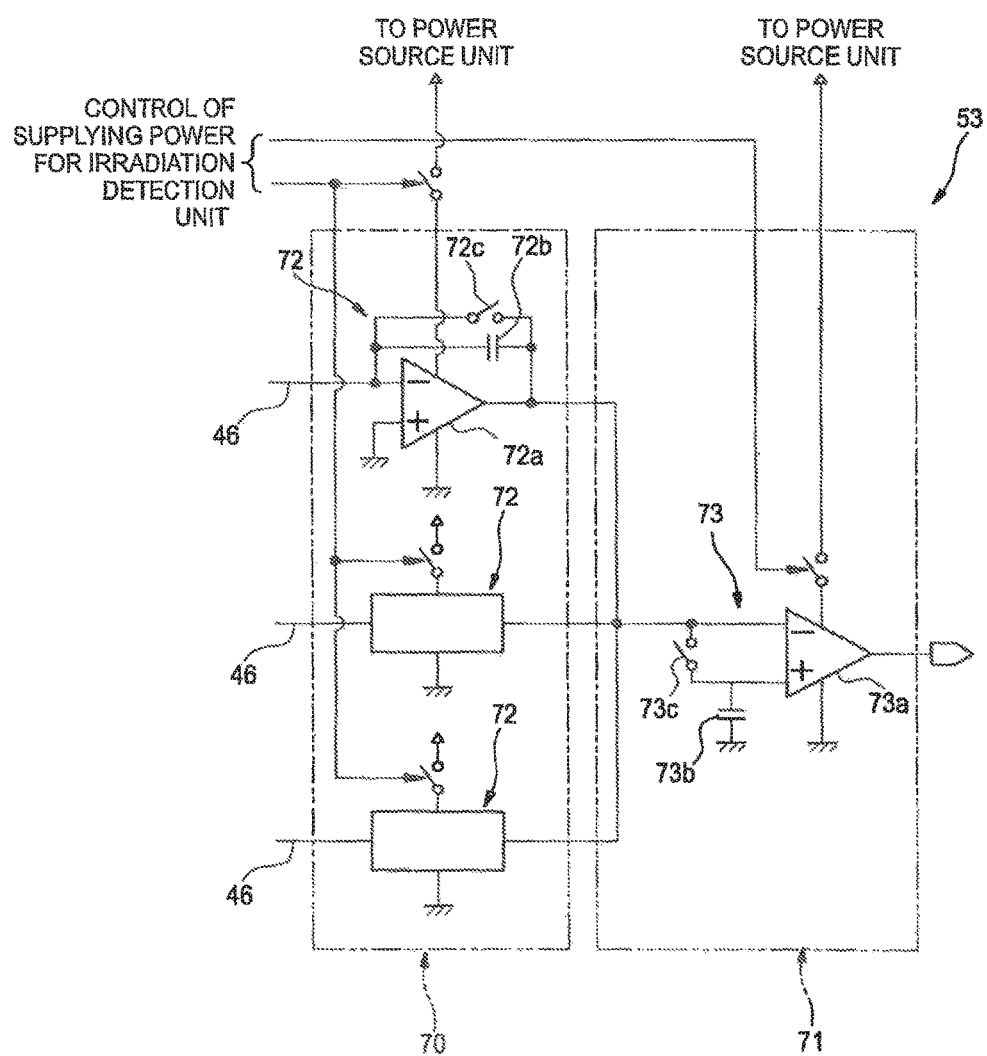
FIG. 6 is a view illustrating a circuit configuration of an irradiation detection unit of the radiation image detector illustrated in FIG. 4.

FIG. 6 illustrates a circuit configuration of the irradiation detection unit 53.

The irradiation detection unit 53 includes an amplifying unit 70 that amplifies electrical signal output from the respective irradiation detecting pixels 41b, and a determination unit 71 that determines X-ray irradiation status based on the electrical signal amplified by the amplifying unit 70.

The amplifying unit 70 includes a plurality of variable gain pre-amplifiers (charge amplifiers) 72 installed to he corresponded to each of the plurality of signal lines 46 and each of the variable gain pre-amplifier 72 is configured to include an operation amplifier 72a of which positive input side is connected to ground, a condenser 72b connected in parallel between negative input side of the operation amplifier 72a and output side thereof, and a reset switch 72c. The switching ON/OFF of the reset switch 72c is controlled by the control unit 55.

The determination unit 71 includes a comparator 73. The comparator 73 is configured to include an operation amplifier 73a, a condenser 73b connected to positive input side of the operation amplifier 73a and supplies an electrical signal considered as a reference to the positive input side, and a switch 73c connecting negative input side of the operation amplifier 73a and the condenser 73b. The negative input side of the operation amplifier 73a is connected in parallel with the respective output terminals of the plurality of the variable gain pre-amplifiers 72 of amplifying unit 70. The ON/OFF switching of the switch 73c is controlled by the control unit 55, and the switch 73c is being turned ON for a predetermined time, such that signal level of the electrical signal input to the negative input side of the operation amplifier 73a is maintained in the condenser 73b.

The supplying of operating power to the amplifying unit 70 and determination unit 71 is controlled by the control unit 55 to periodically supply operating power to the amplifying unit 70 and determination unit 71. Accordingly, an irradiation detecting operation is periodically performed.

The irradiation detecting operation is performed, such that the amplifying unit 70 and determination unit 71 is driven and accordingly, the charges accumulated on the capacitor 42 of the respective irradiation detecting pixels 41b is transmitted through the signal line 46 as electrical signal and input to corresponding variable gain pre-amplifier 72.

The electrical signal input to the respective variable gain pre-amplifiers 72 is amplified with a predetermined amplification factor by the variable gain pre-amplifier 72.

The electrical signals (voltage signal) amplified by the respective variable gain pre-amplifiers 72 are input to the comparator 73 of the determination unit 71 in parallel. The comparator 73 compares a signal level (hereinafter, referred to as input signal level) of the input electrical signal with a signal level (hereinafter, referred to as reference signal level) of the electrical signal which is considered as a reference and maintained in the condenser 73b.

Here, an input signal level of the irradiation detection operation performed at the previous time is maintained in the condenser 73b. After the comparison of the input signal level and the reference signal level is completed, the switch 73c of the comparator 73 is turned ON for a predetermined time, and the input signal level for which comparison is completed is maintained in the condenser 73b. Here, the signal level maintained in the condenser 73b becomes a reference signal level for next irradiation detection operation.

When X-ray is irradiated, electrical charges depending on the received X-ray radiation dose are accumulated on the pixel for detecting irradiation 41b, the input signal level to the comparator 73 becomes larger than the reference signal level, and a detection signal (typically, signal level of any one of positive voltage and negative voltage of operating voltage supplied to the comparator 73) is output from the comparator 73.

The detection signal output from the comparator 73 is input to the control unit 55 and the control unit 55 performs switching of a control mode based on the input detection signal. The control mode will be described later.

The reset switch 72c of the respective variable gain pre-amplifiers 72 is turned ON for a predetermined time and the charge accumulated on the condenser 72b by being read-out from the pixel for detecting irradiation 41b is discharged. The respective irradiation detecting pixels 41b are reset after charges are read-out from the capacitor 42 thereof and discharged from the condenser 62b having accumulated the read-out charges.

Figure 7:
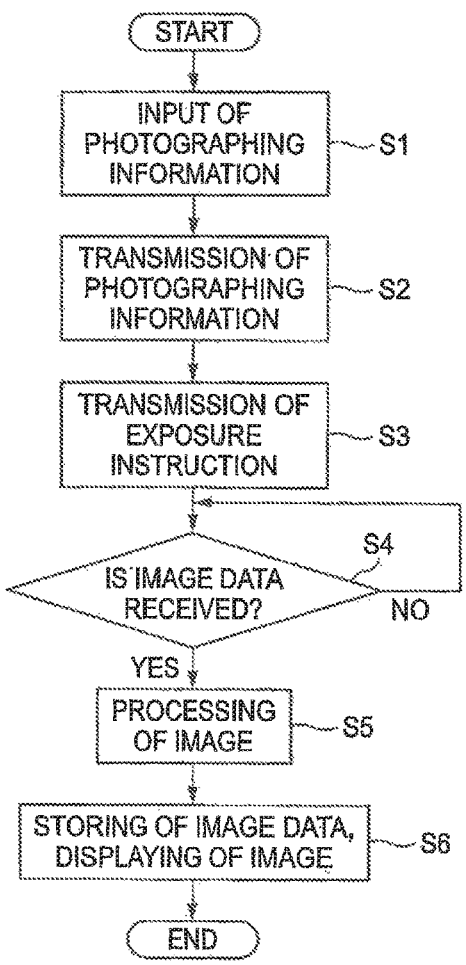
FIG. 7 is a flow chart illustrating an operation flow of a console in the radiation image photographing system illustrated in FIG. 1.

FIG. 7 illustrates an operation flow of the console 3.

First, photographing information is input in the console 3 (step S1). The photographing information includes, such as for example, a name of a subject to be photographed, a body part of the subject to be photographed, exposure conditions of radiation (X-ray) (in the present embodiment, a tube voltage and tube current and an exposure period when performing exposure with radiation (X-ray)) during X-ray image photographing.

When inputting of the photographing information is completed, the console 3 transmits control signal indicative of input completion to the electronic cassette 12. The console 3 transmits the exposure conditions included in the photographing information to the X-ray source 11 (step S2). A preparation for exposure is performed in the X-ray source 11 according to the received exposure conditions.

After the preparation for photographing such as the X-ray source 11, the electronic cassette 12 and determination of the position of the subject is completed, an instruction to exposure is issued from the console 3. The console 3 transmits control signal indicative of exposure instruction to the X-ray source 11 (step S3). X-ray is irradiated from the X-ray source 11 according to the previously set exposure conditions and an X-ray image data is obtained by the electronic cassette 12.

Subsequently, the X-ray image data obtained with the X-ray image photographing described above is transmitted from the electronic cassette 12 to the console 3 (step S4). The console 3 performs image processing such as the aforementioned correction for defect pixel for the received image data (step S5), stores the X-ray image data having been conducted to the image processing in the image storing unit 23, and instructs the monitor 24 to display the X-ray image represented from the X-ray image data (step S6).

Figure 8:
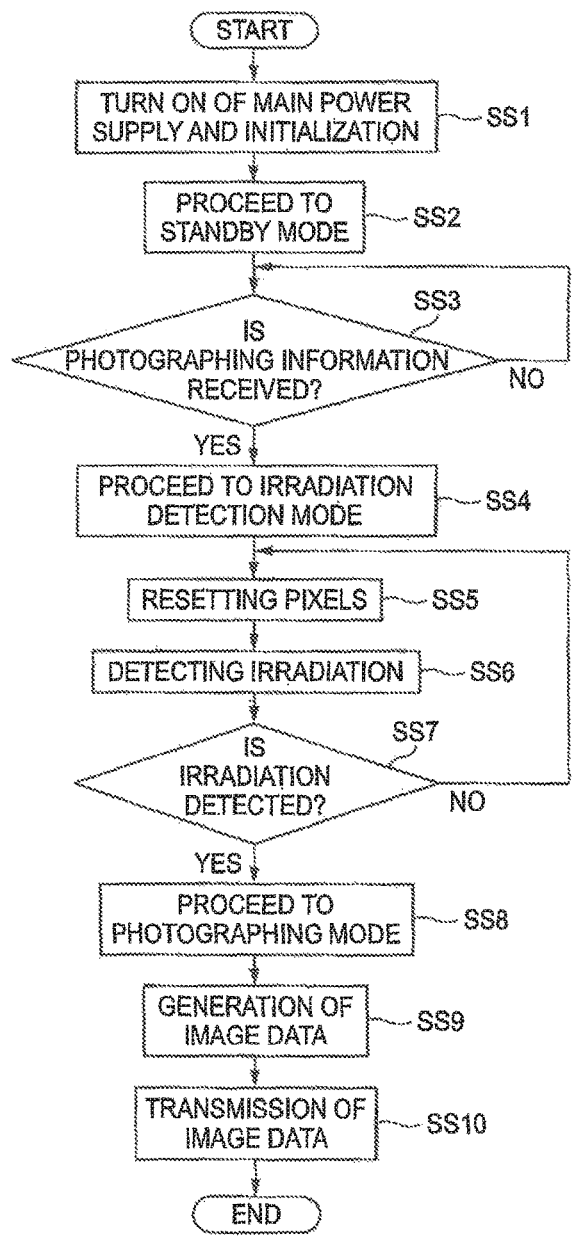
FIG. 8 is a flow chart illustrating an operation flow of the radiation image detecting apparatus in the radiation image photographing system illustrated in FIG. 1.

FIG. 8 illustrates an operation flow of the electronic cassette 12.

First, a main power supply of the electronic cassette 12 is turned ON, and the respective components of the electronic cassette 12 are initialized (step SS1). After the initialization is completed, the electronic cassette 12 proceeds to a standby mode (step SS2). During the standby mode, the operating power is supplied only to the communication unit 52 and the control unit 55, and the electronic cassette 12 waits until the control signal indicative of input completion of the photographing information transmitted from the console 3 is received (step SS3).

When receiving the control signal indicative of input completion of the photographing information, the electronic cassette 12 proceeds from the standby mode to an irradiation detection mode (step SS4).

During the irradiation detection mode, the electronic cassette 12 periodically performs a reset operation of the image detecting pixels 41a to be described below in order to discharge electrical charges accumulated on the respective image detecting pixels 41a by the dark current until X-ray irradiation is detected (step SS5). Further, the electronic cassette 12 periodically performs an irradiation detection operation (step SS6).

When the X-ray irradiation is detected (step SS7), the electronic cassette 12 proceeds from the irradiation detection mode to a photographing mode (step SS8) and begins the aforementioned detection operation of the X-ray image to generate the X-ray image data (step SS9). The electronic cassette 12 transmits the X-ray image data generated with the photographing described above to the console 3 (step SS10).

The electronic cassette 12 may be configured such that the electronic cassette 12 proceeds to, for example, the standby mode after transmitting of the X-ray image data is completed, and otherwise, proceeds to the irradiation detection mode first in preparation for rephotographing and after a predetermined time elapses, proceeds to the standby mode.

Figure 9:
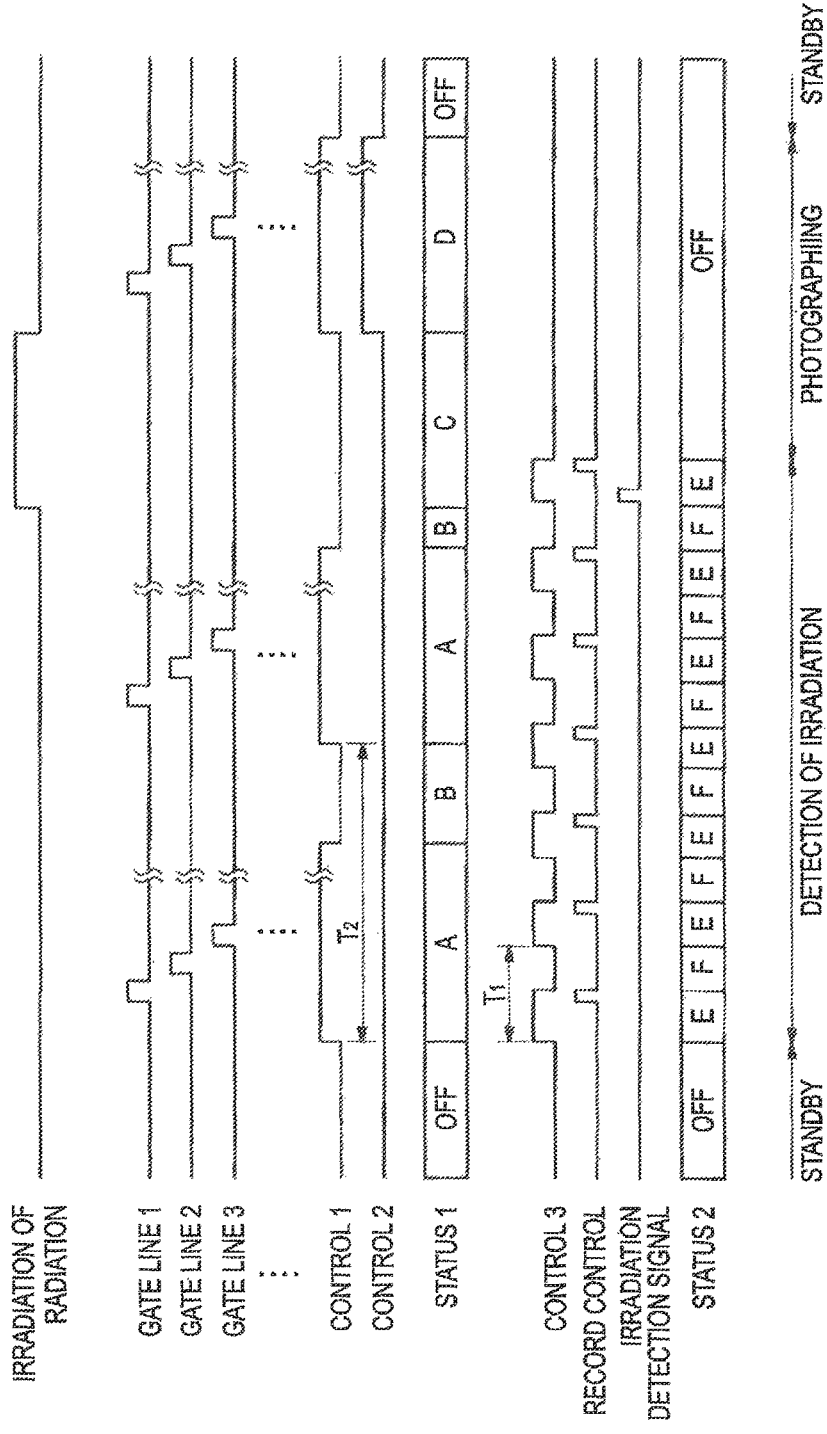
FIG. 9 is a timing chart illustrating the operation timing of the respective components of the radiation image detecting apparatus in the radiation image photographing system illustrated in FIG. 1.

FIG. 9 illustrates an operation timing of the operations of the respective components of the electronic cassette 12 while being in the irradiation detection mode and the photographing mode.

In FIG. 9, "CONTROL 1" shows "CONTROL OF SUPPLYING POWER FOR AMPLIFYING UNIT", "CONTROL 2" shows "CONTROL OF SUPPLYING POWER FOR DATA PROCESSING UNIT", "STATUS 1" shows "STATUS OF IMAGE DATA GENERATION UNIT", "CONTROL 3" shows "CONTROL OF SUPPLYING POWER FOR IRRADIATION DETECTION UNIT", "STATUS 2" shows "STATUS OF IRRADIATION DETECTION UNIT", a reference character "A" shows "RESET OF PIXEL", a reference character "B" shows "PAUSE", a reference character "C" shows "ACCUMULATION OF CHARGES" and a reference character "D" shows "READOUT OF CHARAGES", a reference character "E" shows "DETECTION" and a reference character "F" shows "PAUSE".

During the irradiation detection mode, the irradiation detection operation is periodically performed. That is, the operating power is periodically supplied from the power source unit 54 to the irradiation detection unit 53 (amplifying unit 70 and determination unit 71) according to control by the control unit 55, and the irradiation detection unit 53 is periodically performed. As such, the irradiation detection operation is periodically performed and the operating power is periodically supplied from the power source unit 54 to the irradiation detection unit 53, so that power consumption of the irradiation detection unit 53 can be reduced.

As the irradiation detection unit 53 is driven, the charges accumulated on the respective irradiation detecting pixels 41b are read-out and amplified in amplifying unit 70 and then, input to the determination unit 71. A comparison of the input signal level with the reference signal level maintained in the condenser 73b of the comparator 73 is performed in the comparator 73 of the determination unit 71.

At end of an operation period for each irradiation detection operation, the switch 73c of the comparator 73 is turned ON for a predetermined time according to a record control by the control unit 55, and the input signal level for which comparison is completed is maintained in the condenser 73b. Accordingly, the input signal level is compared with an input signal level in the previous irradiation detection operation, and the irradiation detection operation is performed based on a difference between both signal levels.

Even when X-ray is not irradiated, electrical charges generated due to dark currents are accumulated in the irradiation detecting pixels 41b during a pause period of the irradiation detection operation. In performing the irradiation detection operation periodically, the irradiation detection is performed based on a difference between the input signal level and an input signal level in the previous irradiation detection operation to exclude an influence of the charges by the dark current, so that it is possible to more accurately perform the irradiation detection.

When X-ray is irradiated, since the charges depending on the received X-ray dose are accumulated in one or more irradiation detecting pixels 41b, a difference more than a predetermined value between the input signal level and a reference signal level is generated and a detection signal is output to the control unit 55 from the determination unit 71 according to the generated difference. The control unit 55 proceed to a photographing mode based on the input detection signal.

During the irradiation detection mode, a reset operation of the image detecting pixels 41a is periodically performed. In the illustrated example, the driving pulse is supplied to the TFT switching device 43 through the gate line 44 from the scanning unit 50, and the TFT switching device 43 is sequentially turned ON one row by one row. Electrical charges accumulated due to the dark current is read-out from the pixel for detecting image 41a to which the TFT switching device 43 having been turned ON and the charge read-out is accumulated on the condenser 62b of variable gain pre-amplifier 62 corresponding to the amplifying unit 60 through the data line 45 connected to the TFT switching device 43. The reset switch c of the respective variable gain pre-amplifier 62 is turned ON for a predetermined time, charges accumulated on the condenser 62b are discharged and the image detecting pixels 41a is reset. The TFT switching device 43s of a plurality of rows or all the rows may be turned ON to reset the image detecting pixels 41a of the plurality of rows or all the rows at once.

Here, it is not necessary to generate the image data in the reset operation of the image detecting pixels 41a described above and thus the data processing unit 61 also does not need to be operated. Therefore, in the electronic cassette 12, the operating power is supplied separately to the amplifying unit 60 and the data processing unit 61 according to the control of the control unit 55, and the operating power is supplied only to the amplifying unit 60 in the irradiation detection mode. By doing this, power consumption in the image data generation unit 51 can be reduced.

In the electronic cassette 12, the supplying of operating power to the amplifying unit 60 is periodically performed in synchronized with the reset operation of the image detecting pixels 41a. By doing this, power consumption in the image data generation unit 51 can be further reduced.

Further, it is preferable to make operation period $T_1$ of the irradiation detection operation shorter than operation period $T_2$ of the reset operation of the image detecting pixels 41a. It is preferable to detect irradiation at high speed as much as possible and quickly begin the accumulation of charges caused by the resetting of the pixels in order to effectively utilize X-ray energy irradiated. Since the number of the image detecting pixels 41a is much more than that of the irradiation detecting pixels 41b, it is possible to rapidly detect the irradiation by making the operation period $T_1$ of the irradiation detection operation shorter than the operation period $T_2$ of the reset operation.

When the X-ray irradiation is detected by the irradiation detection unit 53 and proceeds to the photographing mode, electrical charges are accumulated on the respective image detecting pixels 41a during the X-ray irradiation period.

After being proceeded to the photographing mode, the supplying of operating power to the irradiation detection unit 53 (amplifying unit 70 and determination unit 71) is also stopped. Further, during the X-ray irradiation period, the charges are not read-out from the respective image detecting pixels 41a and the supplying of operating power to the image data generation unit 51 (amplifying unit 60 and data processing unit 61) is stopped. Accordingly, power consumption can be further reduced.

After the X-ray irradiation is completed, operating power is supplied to the amplifying unit 60 and the determination unit 61 of the image data generation unit 51, the charges are read-out sequentially from the respective image detecting pixels 41a one row by one row to generate the X-ray image data. The generated the X-ray image data is transmitted to the console 3.

Figure 10:
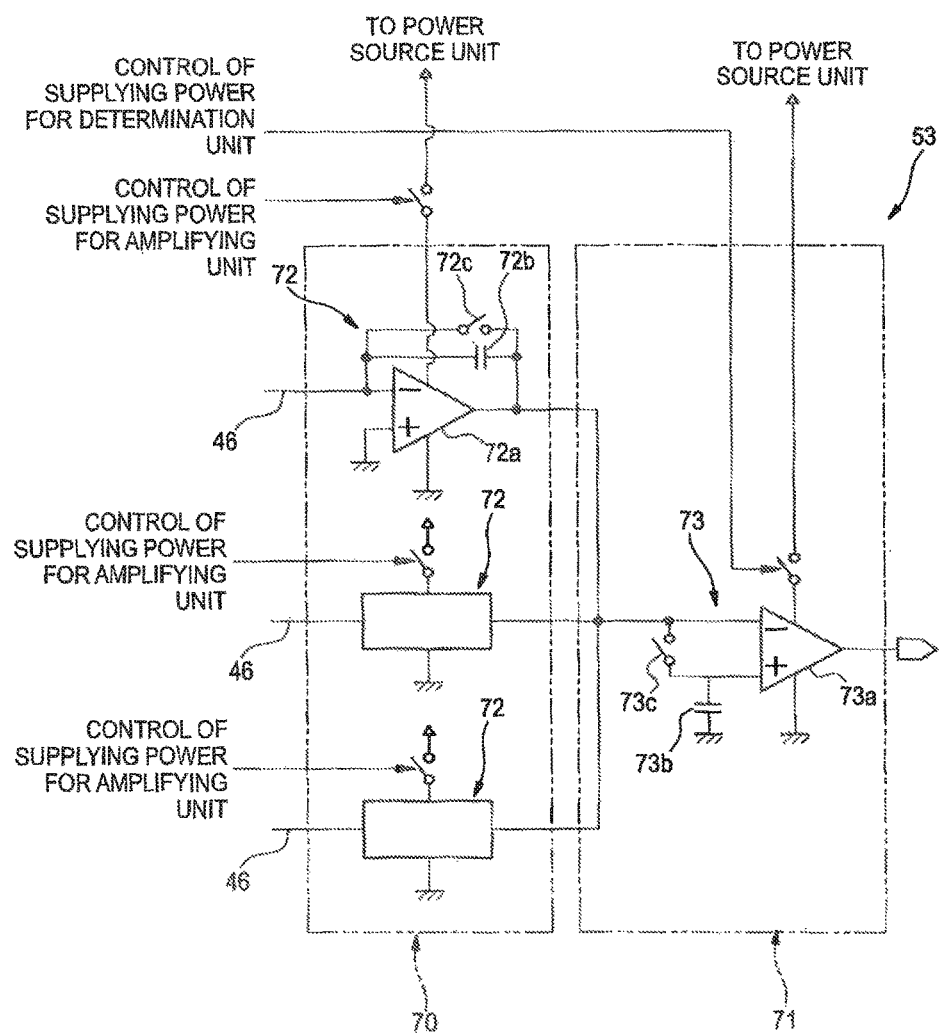
FIG. 10 is a view illustrating a circuit configuration of an irradiation detection unit in a modified example of the radiation image detecting apparatus illustrated in FIG. 3.

FIG. 10 illustrates a circuit configuration of the modified example of the irradiation image detection unit of the aforementioned electronic cassette 12.

The aforementioned electronic cassette 12 is configured such that all the variable gain pre-amplifier 72 included in the amplifying unit 70 of the irradiation detection unit 53 is driven according to supplying of operating power to the irradiation detection unit 53 of the FPD 30. However, an electronic cassette 12 illustrated in FIG. 10 is configured such that operating power may be separately supplied to the respective variable gain pre-amplifiers 72, and the supplying of the operating power to the respective variable gain pre-amplifiers 72 is controlled by the control unit 55. The rest of the configuration is common to the aforementioned electronic cassette 12 and thus description thereof will be omitted.

FIG. 11 illustrates an operation timing of the respective components of the electronic cassette 112 While being in the irradiation detection mode and the photographing mode.

Similarly to FIG. 9, "CONTROL 1" shows "CONTROL OF SUPPLYING POWER FOR AMPLIFYING UNIT", "CONTROL 2" shows "CONTROL OF SUPPLYING POWER FOR DATA PROCESSING UNIT", "STATUS 1" shows "STATUS OF IMAGE DATA GENERATION UNIT", "STATUS 2" shows "STATUS OF IRRADIATION DETECTION UNIT", a reference character "A" shows "RESET OF PIXEL", a reference character "B" shows "PAUSE", a reference character "C" shows "ACCUMULATION OF CHARGES" and a reference character "D" shows "READ-OUT OF CHARAGES", a reference character "E" shows "DETECTION" and a reference character "F" shows "PAUSE".

In addition, "CONTROL 4" shows "FIRST CONTROL OF SUPPLYING POWER FOR AMPLIFYING UNIT", "CONTROL 5" shows "SECOND CONTROL OF SUPPLYING POWER FOR AMPLIFYING UNIT" and "CONTROL 6" shows "CONTROL OF SUPPLYING POWER FOR DETERMINATION UNIT".

During the irradiation detection mode, an irradiation detection operation is periodically performed. However, for each irradiation detection operation, one variable gain pre-amplifier 72 is sequentially selected in the amplifying unit 70 of the irradiation detection unit 53 and operating power is supplied only to the selected variable gain pre-amplifier 72. Further, the operating power is supplied to the determination unit 71 for each irradiation detection operation.

In this case, electrical charges accumulated on the pixel for detecting irradiation 41b connected to the signal line 46 corresponding to the selected variable gain pre-amplifier 72 is read-out, amplified in the selected variable gain pre-amplifier 72 and then, input to the determination unit 71. A comparison of the input signal level with the reference signal level maintained in the condenser 73b of the comparator 73 is performed in the comparator 73 of the determination unit 71 to detect the irradiation based on the difference between both signal levels.

According to the configuration described above, it is possible to reduce power consumption of the irradiation detection unit 53 as compares with a case where all the variable gain pre-amplifiers 72 included in the amplifying unit 70 is driven for each irradiation detection operation. In this modified example, one variable gain pre-amplifier 72 is selected in the amplifying unit 70 of the irradiation detection unit 53 to be driven, but it is possible to obtain effect described above as long as some of the variable gain pre-amplifier 72 included in the amplifying unit 70 are driven.

In the description as described above, a general X-ray is used as the radiation, but the present invention is not limited the X-ray and radiation other than X-ray such as a ray or γ ray may be utilized.

As described above, the radiation image detection apparatus as described in the following (1) to (8) and the radiation image photographing system as described in the following (9) are disclosed.

(1) A radiation image detection apparatus, includes: an image receiving unit having a two-dimensional array of a plurality of pixels for detecting image and one or more pixels for detecting irradiation that generate electrical charges when being subjected to irradiation of radiation; an image data generation unit configured to generate an image data based on an electrical signal output from the respective pixels for detecting image; an irradiation detection unit configured to detect an irradiation of radiation based on the electrical signal output from the respective pixels for detecting irradiation; and a control unit configured to include a plurality of control modes including a photographing mode generating an image data and an irradiation detection mode detecting an irradiation of radiation, in which the image data generation unit includes a first amplifying unit amplifying the electrical signal output from the respective pixels for detecting image and a data processing unit converting the electrical signal amplified by the first amplifying unit into the image data, and is configured to separately supply operating power to each of the first amplifying unit and the data processing unit, and the control unit, during the irradiation detection mode, stops supplying of an operating power to the data processing unit until the irradiation of radiation is detected by the irradiation detection unit, and when the irradiation of radiation is detected by the irradiation detection unit, the control unit proceeds to the photographing mode and begins supplying the operating power to the data processing unit.

(2) It is a radiation image detection apparatus according to (1), in which: the control unit, during the irradiation detection mode, periodically supplies the operating power to the irradiation detection unit to be periodically operated.

(3) It is a radiation image detection apparatus according to (2), in which: the irradiation detection unit includes a storing unit storing a signal value corresponding to the electrical signal input, and detects the irradiation of radiation based on a difference between the signal value stored in the storing unit and the signal value corresponding to the electrical signal input.

(4) It is a radiation image detection apparatus according to (2) or (3), in which: the image receiving unit includes a plurality of pixels for detecting irradiation, the irradiation detection unit is installed for each pixel for detecting irradiation or each pixel group for detecting irradiation having ones of the plurality of pixels for detecting irradiation, and the irradiation detection unit further includes: a second amplifying unit provided with a plurality of amplifiers amplifying electrical signal output from the corresponding pixels for detecting irradiation or the pixel group for detecting irradiation; and a determination unit detecting irradiation of radiation based on the electrical signal amplified by the second amplifying unit, the second amplifying unit is capable of separately supplying the operating power to the respective amplifiers, and the control unit supplies the operating power to ones of the amplifiers selected sequentially from the plurality of amplifiers for each operation period in a periodic operation of the irradiation detection unit.

(5) It is a radiation image detection apparatus according to any one of (2) to (4), in which: the control unit, during the irradiation detection mode, periodically supplies the operating power to the first amplifying unit to be periodically operated, so that a reset operation extracting the electrical charges generated in the respective pixels for detecting image is periodically performed until the irradiation of radiation is detected by the irradiation detection unit.

(6) It is a radiation image detection apparatus according to (5), in which: the operation period of the irradiation detection unit is shorter than that of the reset operation of the respective pixels for detecting image.

(7) It is a radiation image detection apparatus according to any one of (1) to (6), in which: the control unit stops supplying the operating power to the irradiation detection unit after the irradiation of radiation is detected by the irradiation detection unit.

(8) It is a radiation image detection apparatus according to any one of (1) to (7) in which: the radiation image detection apparatus is a portable type.

(9) A radiation image photographing system, includes: a radiation image detection apparatus according to any one of (1) to (8); and a console to which photographing information is input, in which the control unit defines a timing at which an input of the photographing information is completed in the console as a starting timing of the irradiation detection mode.

What is claimed is:
1. An X-ray image detection apparatus, comprising:
an image receiving unit having a two-dimensional array of a plurality Of pixels that generate electrical charges when being subjected to irradiation of X-ray, the plurality of pixels including:
a plurality of pixels for detecting an image; and
one or more pixels for detecting irradiation;
an image data generation unit configured to generate image data based on an electrical signal output from the respective pixels for detecting an image;
an irradiation detection unit configured to detect the irradiation of X-ray based on the electrical signal output from the respective pixels for detecting irradiation;
a communication unit that transmits the image data generated in the image data generation unit; and
a control unit configured to include a plurality of control modes including a photographing mode generating image data, an irradiation detection mode detecting whether to be a state where an irradiation of X-ray is made or a state where an irradiation of X-ray is not made and a waiting mode to wait to receive a control signal from a console,
wherein when the state where an irradiation of X-ray is made is detected by the irradiation detection unit during the irradiation detection mode, the control unit is configured to proceed to the photographing mode, after the image data generated in the image data generation unit is transmitted by the communication unit, the control unit is configured to proceed to the waiting mode, and
wherein there is no other mode between the irradiation detection mode and the waiting mode.

2. The X-ray image detection apparatus according to claim 1, wherein the control unit is configured to supply an operating power only to the control unit and the communication unit during the waiting mode.

3. An X-ray image photographing system, comprising:
the X-ray image detection apparatus according to claim 1; and
a console to which photographing information is input,
wherein the control unit is configured to change to the irradiation detection mode from the waiting mode at a timing at which an input of the photographing information is completed in the console.

4. The X-ray image detection apparatus according claim 1, wherein the photographing mode is directly changed to the irradiation detection mode, and after the direct change of the photographic mode to the irradiation detection mode, the irradiation detection mode is directly changed to the waiting mode.

5. The X-ray image detection apparatus according claim 1, wherein there is no other mode between the photographic mode and the irradiation detection mode.

6. An X-ray image detection apparatus, comprising:
an image receiving unit having a two-dimensional array of a plurality of pixels that generate electrical charges when being subjected to irradiation of X-ray, the plurality of pixels including:
a plurality of pixels for detecting an image; and
one or more pixels for detecting irradiation;

an image data generation unit configured to generate image data based on an electrical signal output from the respective pixels for detecting an image;

an irradiation detection unit configured to detect the irradiation of X-ray based on the electrical signal output from the respective pixels for detecting irradiation;

a communication unit that transmits the image data generated in the image data generation unit; and a control unit configured to include a plurality of control modes including a photographing mode generating image data, an irradiation detection mode detecting whether to be a state where an irradiation of X-ray is made or a state where an irradiation of X-ray is not made and a waiting mode to wait to receive a control signal from a console, wherein when the state where an irradiation of X-ray is made is detected by the irradiation detection unit during the irradiation detection mode, the control unit is configured to proceed to the photographing mode, after the image data generated in the image data generation unit is transmitted by the communication unit, the control unit is configured to proceed to the waiting mode, and wherein the photographing mode is directly changed to the irradiation detection mode, and after the direct change of the photographic mode to the irradiation detection mode, the irradiation detection mode is directly changed to the waiting mode.

* * * * *